United States Patent
Beach et al.

(10) Patent No.: US 7,034,097 B2
(45) Date of Patent: Apr. 25, 2006

(54) POLYURETHANE ELASTOMERS WITH COMBINATION OF CURATIVES

(75) Inventors: Bradley L. Beach, Lexington, KY (US); Bhaskar Gopalanarayanan, Lexington, KY (US); Kelly A. Killeen, Lexington, KY (US); Johnny D. Massie, II, Lexington, KY (US); Ronald L. Roe, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/756,009

(22) Filed: Jan. 13, 2004

(65) Prior Publication Data

US 2005/0154173 A1 Jul. 14, 2005

(51) Int. Cl.
 *C08G 18/62* (2006.01)
(52) U.S. Cl. .......................... 528/75; 528/59; 528/28; 528/85; 428/36.9; 428/906; 399/279
(58) Field of Classification Search ................. 528/28, 528/59, 75, 85; 428/36.9, 906; 399/279
See application file for complete search history.

(56) References Cited

U.S. PATENT DOCUMENTS

| | | | |
|---|---|---|---|
| 3,823,201 A | 7/1974 | Pizzini et al. | |
| 4,111,861 A * | 9/1978 | Godlewski | 521/123 |
| 4,210,727 A | 7/1980 | Preston et al. | |
| 4,258,148 A | 3/1981 | Chandalia et al. | |
| 4,359,542 A | 11/1982 | Chandalia et al. | |
| 4,359,571 A | 11/1982 | Bernstein et al. | |
| 4,504,313 A * | 3/1985 | Robertson | 106/38.2 |
| 4,521,546 A | 6/1985 | O'Connor et al. | |
| 5,021,506 A | 6/1991 | Gastinger et al. | |
| 5,070,141 A | 12/1991 | Gastinger et al. | |
| 5,223,570 A | 6/1993 | Huang et al. | |
| 5,250,581 A | 10/1993 | Gastinger et al. | |
| 5,262,486 A | 11/1993 | Telser et al. | |
| 5,733,973 A | 3/1998 | Wamprecht et al. | |
| 5,810,705 A | 9/1998 | Mimura et al. | |
| 5,843,577 A | 12/1998 | Ouhadi et al. | |
| 5,925,893 A | 7/1999 | Ishii et al. | |
| 6,011,090 A | 1/2000 | Sakogawa et al. | |
| 6,035,172 A | 3/2000 | Mimura et al. | |
| 6,142,922 A | 11/2000 | Yoshikawa et al. | |
| 6,265,457 B1 | 7/2001 | Dolgopolsky et al. | |
| 6,414,081 B1 | 7/2002 | Ouhadi | |
| 6,489,382 B1 | 12/2002 | Giesecke et al. | |
| 6,515,077 B1 | 2/2003 | Su et al. | |

OTHER PUBLICATIONS

Oertel, Handbook of Polyurethanes, 1985, pp. 430-432.*
U.S. Appl. No. 10/756, 494, filed Jan. 13, 2004, Killeen et al.
U.S. Appl. No. 10/755, 904, filed Jan. 13, 2004, Beach et al.
U.S. Appl. No. 10/756, 220, filed Jan. 13, 2004, Gopalanarayanan et al.

* cited by examiner

*Primary Examiner*—Rachel Gorr
(74) *Attorney, Agent, or Firm*—Dinsmore and Shohl, LLP

(57) ABSTRACT

Polyurethane elastomers are formed from first and second graft curatives, each graft curative having a molecular weight of at least about 800, wherein the first and second graft curatives are substantially immiscible with one another, and wherein the polyurethane elastomer exhibits a hardness of less than about 40 Shore A according to ASTM D2240-86 and a compression set of less than about 8% according to ASTM D395-89, method B, at a temperature of about 70° C. for about 22 hours. Rolls are manufactured using such polyurethane elastomers, particularly rolls that are suitable for use in image forming devices, such as electrophotographic print applications.

33 Claims, No Drawings

POLYURETHANE ELASTOMERS WITH COMBINATION OF CURATIVES

FIELD OF THE INVENTION

The present invention relates to polyurethane elastomers and their methods of manufacture. The invention further relates to rolls comprised of such polyurethane elastomers and their methods of manufacture. In particular, the invention relates to polyurethane elastomers and methods of manufacturing polyurethane elastomers exhibiting particular hardness and compression profiles. In addition, the invention relates to polyurethane elastomers used for producing rolls suitable for use, for example, in image forming devices, including electrophotographic print applications.

BACKGROUND OF THE INVENTION

Because of their wide availability, relative inexpense and versatility, polyurethane elastomers with specific physical properties have been adapted for use in a diverse array of technical applications. One such application is as conductive and semi-conductive members in image forming devices. It has been desirable to develop more compact image forming devices having a smaller device footprint. Consequently, the need for development of reduced-geometry printer components arose. However, it has been discovered that the necessary size adaptations alters the functioning of various elastomeric components with respect to, for example, required compressive forces, nip widths, low compression set, low hardness, triboelectric charging capacity, and rotational torque. Utilization of reduced-geometry components having the same elastomeric properties as the originally-sized components often result in the occurrence of unacceptable print variations and distortions in the final printed product. Hence, new materials adapted to confer physical properties which would compensate for the reduced-geometry and restore the quality of the final printed product are needed.

In particular, polyurethane elastomers have been used as roll components of a laser printer. Generally, a polyurethane elastomer is formed by sufficiently curing a polyurethane mixture typically comprising a prepolymer to provide the polymer backbone, and one or more curatives (typically chain-extenders and/or cross-linkers), as well as various solvents, catalysts, and other additives depending on the need. Typically, curatives comprise at least di-functionality, to act as chain extenders or tri-functionality to act as cross-linkers to promote networking within the matrix, functional groups being generally defined as groups comprising active hydrogens, for example, amines or hydroxyls.

Reaching a desired elastomer hardness by manipulating selection of the urethane prepolymer and monomers forming the curative components of the final elastomer often results in unacceptable compromises in other properties of the elastomer. Typically, plasticizers are used to reduce the hardness of polymeric elastomers such as cast urethanes. However, plasticizing additives, which are not chemically bonded into the polymer matrix, and are therefore free to migrate throughout the roll, including to the surface, may cause problems in electrophotographic print applications. At the surface of the developer roll, these migrating additives interact with the toner particles, causing the toner particles to undesirably coalesce.

Hence, there is a clear need for softer polyurethane elastomers having low hardness and for methods of manufacturing them. In addition, it would be advantageous to provide inexpensive, more versatile curatives, which could confer desirable property profiles to polyurethane elastomers required by particular applications.

SUMMARY OF THE INVENTION

Accordingly, it is an object of the invention to provide polyurethane elastomers suitable for use, for example, in rolls. In one aspect of the present invention, polyurethane elastomers are formed from first and second graft curatives, each graft curative having a molecular weight of at least about 800, wherein the first and second graft curatives are substantially immiscible with one another, and wherein the polyurethane elastomer exhibits a hardness of less than about 40 Shore A according to ASTM D2240-86 and a compression set of less than about 8% according to ASTM D395-89, method B, at a temperature of about 70° C. for about 22 hours.

In another aspect of the present invention, the polyurethane elastomers are formed from a urethane prepolymer, first and second graft curatives, each graft curative having a molecular weight of at least about 800, wherein the first and second graft curatives are substantially immiscible with one another and the first graft curative comprises a diol having an acrylate side chain and the second graft curative comprises a diol having a silicone side chain, polybutadiene diol, tri-functional polyol curative comprising polyether triol, conductive modifier comprising ferric chloride, hydrolytic stabilizer, and antioxidant, and wherein the polyurethane elastomer exhibits a hardness of less than about 40 Shore A according to ASTM D2240-86 and a compression set of less than about 4% according to ASTM D395-89, method B, at a temperature of about 70° C. for about 22 hours.

It is another aspect of the present invention to provide methods for manufacturing polyurethane elastomers. The methods comprise curing a polyurethane mixture comprising urethane prepolymer and first and second graft curatives, each graft curative having a molecular weight of at least about 800, wherein the first and second graft curatives are substantially immiscible with one another, wherein the polyurethane elastomer comprises a hardness of less than about 40 Shore A and a compression set of less than about 8%.

In another aspect of the present invention, the methods comprising curing a polyurethane mixture comprising urethane prepolymer, first and second graft curatives, each graft curative having a molecular weight of at least about 800, wherein the first and second graft curatives are substantially immiscible with one another and the first graft curative comprises a diol having an acrylate side chain and the second graft curative comprises a diol having a silicone side chain, polybutadiene diol, tri-functional polyol curative comprising polyether triol, conductive modifier comprising ferric chloride, hydrolytic stabilizer, and antioxidant, wherein the polyurethane elastomer exhibits a hardness of less than about 40 Shore A according to ASTM D2240-86 and a compression set of less than about 4% according to ASTM D395-89, method B, at a temperature of about 70° C. for about 22 hours.

It is yet another aspect of the present invention, to provide rolls comprising a polyurethane elastomer formed from a urethane prepolymer, first and second graft curatives, each graft curative having a molecular weight of at least about 800, wherein the first and second graft curatives are substantially immiscible with one another, tri-functional polyol curative, conductive modifier, hydrolytic stabilizer, and, optionally, antioxidant.

Accordingly, it is another aspect of the present invention to provide methods for manufacturing rolls comprising casting a polyurethane mixture into a mold, wherein the polyurethane mixture comprises a urethane prepolymer and first and second graft curatives, each graft curative having a molecular weight of at least about 800, wherein the first and second graft curatives are substantially immiscible with one another, tri-functional polyol curative, conductive modifier, hydrolytic stabilizer, and, optionally, antioxidant; curing the polyurethane mixture to allow demolding of the roll; demolding the roll and, optionally, post-curing the demolded roll; grinding the roll to desired dimensions; and baking the roll under conditions sufficient to oxidize an outer layer of the roll.

The polyurethane elastomers exhibit advantageous combinations of properties. In one embodiment, the polyurethane elastomers are suitable for use in rolls of image forming devices. Other advantages, applications and embodiments of the present invention will become apparent to those skilled in this art from the following description wherein there are described several embodiments of this invention for carrying out the invention. As will be realized, the invention is capable of other different aspects, all without departing from the invention. Accordingly, the descriptions should be regarded as illustrative in nature and not restrictive.

DETAILED DESCRIPTION

In one embodiment, the polyurethane elastomer is formed from first and second graft curatives, each having a molecular weight of at least about 800, wherein the first and second graft curatives are substantially immiscible with one another, and wherein the polyurethane elastomer exhibits a hardness of less than about 40 Shore A and a compression set of less than about 8%. As used herein, polyurethane mixture refers to the combination of components from which the polyurethane elastomer is formed by curing. Thus, the polyurethane mixture comprises the combination of components in substantially uncured form. The substantial immiscibility of the graft curatives provides unexpected improvement in lowering hardness and maintaining a lower compression set of the polyurethane elastomer. Molecular weight is defined as the number average molecular weight (hereinafter referred to as $M_n$ or simply molecular weight).

As can be appreciated by those having ordinary skill in the art, substances are generally considered "immiscible" where they are in the same phase or state of matter but cannot be uniformly mixed or blended. Such a characteristic of a mixture is qualitative in nature.

In one exemplary embodiment of the present invention, the polyurethane elastomer may be formed from a urethane prepolymer. Types of urethane prepolymers added to the polyurethane mixture may comprise polyether, polyester, or polycaprolactone prepolymers with various isocyanate terminations. For example, Versathane® PHP70A, which is a polyether type urethane prepolymer, Versathane® A-7QM which is a polyester type urethane prepolymer, both produced by Air Products, and Vibrathane® 6060, which is a polycaprolactone type urethane prepolymer, produced by Crompton Uniroyal Chemical Co., can all be used. More specifically, in another embodiment, polycaprolactone ester toluene-diisocyante prepolymer, such as Vibrathane® 6060 is added to the polyurethane mixture because of its stable electrical resistivity with temperature and humidity changes. Other polycaprolactone type urethane prepolymers can also be used, for example, the urethane prepolymers having caprolactone based polyester moieties, as disclosed in referenced U.S. Pat. No. 6,117,557, which is herein incorporated by reference, can be used.

Polyurethane elastomers having a relatively low hardness can be used in developing a roll desirable for image forming devices, for example, where the low hardness allows for more uniform toner distribution during the functional life of a laser printer. While a curative can be used to lower the hardness, higher concentrations of the curative tend to increase the compression set simultaneously. Hence, it is important to develop polyurethane elastomers that utilize improved effects provided by combining particular curatives.

Due to the needs of particular laser printer applications, it is desirable to develop a polyurethane elastomer exhibiting decreased hardness while retaining the compression set of polyurethane elastomers previously utilized in such applications. For purposes of assessing the relevant physical parameters of the present invention, compression set is measured under ASTM D395-89 using method B, such that compression set is measured at an original compression of 25% of the elastomer at about 70° C. for about 22 hours. Hardness values reported herein are determined according to ASTM Method D 2240-86, and measured in Shore A.

Reactive polyols have been demonstrated to lower the hardness in other polyurethanes such as those disclosed in Lexmark Docket No. 2002-0794.00, entitled, "Polyurethane Rolls and Methods of Manufacturing," and Lexmark Docket No. 2003-0044.00, entitled, "Polyurethane Rolls with Graft Polyacrylate Curatives," which are herein incorporated by reference. Although the addition of such curatives is known to reduce the hardness of the cured polyurethane elastomer to a range from about 42 to about 45 Shore A, in order to obtain hardness values less than about 40 Shore A, the resultant polyurethane elastomers suffer from increased compression set values. The combination of two or more substantially immiscible graft curatives having high $M_n$, according to the invention, not only decreases the hardness of the polyurethane elastomer to levels less than about 40 Shore A, but maintains low compression set, for example, less than about 5%.

In one embodiment, a combination of graft curatives, such as diol, polyol, diamine, polyamine, or a combination of two or more of such graft curatives can be added to the polyurethane mixture, in order to provide a polyurethane elastomer which has a desirably low hardness value. One skilled in the art can appreciate that polyol and polyamine include triol and triamine materials. High $M_n$ diol, polyol, diamine or polyamine refers to any material having hydroxyl-terminated or amine-terminated hydrocarbons or similar components known by one skilled in the art. The graft curatives extend the molecular chain length of the soft segment of the polyurethane elastomers, which in turn reduces the hard segment of the polyurethane elastomer, thus contributing to the low hardness value of the polyurethane elastomer.

In another embodiment, the substantial immiscibility of the graft curatives provides an improved effect, where the combination not only lowers the hardness of the polyurethane elastomer, but also prevents the polyurethane elastomer from suffering other undesirable properties, such as higher compression set and high levels of extractable materials, as previously encountered by those skilled in the art. In one embodiment, this allows for the production of polyurethane elastomers which exhibit a hardness less than about 40 Shore A, while maintaining low compression set and low amounts of extractable material. In another exemplary embodiment, the compression set of the elastomer is less than about 8%, as measured by ASTM D395-89 using method B at a temperature of 70° C. for 22 hours. In another embodiment the compression set for the elastomer is less than about 6%. In yet another embodiment the compression set for the elastomer is less than about 4%. In one embodiment, the extractable material is less than about 5% by weight of the polyurethane elastomer. The extent of unreacted extractable material can be evaluated using a Soxhlet extraction technique in chloroform. The polyurethane elastomer after being cured is cut into small pieces, from about 8 $mm^3$ to about 27 $mm^3$ and placed in a Soxhlet tube. The Soxhlet tube is suspended inside a flask over boiling chloroform and fitted with a reflux condenser for about 24 hours. The chloroform is subsequently allowed to dry and measured for the amount of non-volatile extractable material that remains from the polyurethane elastomer.

In a more specific embodiment the graft curatives included in the polyurethane mixture are comprised of a low $M_n$ diol main chain and a high $M_n$ side chain. The diols on the graft curative then provide the active hydrogens for linking the urethane prepolymers and other curatives in the polyurethane mixture solution to form the final polyurethane elastomer product. Other embodiments of the invention comprise graft curatives comprising additional functional groups on the side chain as well, for example, the graft curatives can include acrylate, silicone, polyether (e.g., PTMG) or polyester (e.g., caprolactone) side chains. More particular, in one exemplary embodiment, the acrylate side chain can comprise n-butylacrylate. In the embodiments of the present invention involving the roll, the graft curative has a $M_n$ of at least about 800, which is defined as being of high $M_n$. The graft curative also has a relatively low $M_n$ main chain, defined as having a $M_n$ of less than about 200. In one embodiment, the graft curative comprises a high $M_n$ side chain, defined as having a $M_n$ of greater than 600. In a more specific embodiment, the high $M_n$ side chain has a $M_n$ of from greater than about 600 to about 25,000, and in an even more specific embodiment, the high $M_n$ side chain has a $M_n$ of from about 800 to about 10,000. Embodiments directed to the manufacture of these curatives comprise free radical polymerization to form curatives comprising side chains and diol terminated main chains reflecting these $M_n$ ranges, as disclosed in Lexmark Docket No. 2002-0785.00, entitled, "Graft Polymer Curatives and Polyurethanes Formed Therefrom," which is herein incorporated by reference. Embodiments directed to polyurethane elastomers and the manufacture of such polyurethane elastomers employ the graft curatives as described.

Exemplary curatives that can be added to the polyurethane mixture include, polycaprolactone diols, such as TONE® 0260, produced by Union Carbide Corp., polyether diols or triols, such as Voranol® 5815, produced by Dow Chemical Co., Poly-G VHP® 55-37 or Poly-G VHP® 85-29 from Olin Chemical Corp. and Pluracol® 380 from BASF, polyester diols, such as Fomrez® 11-36 or Fomrez® 55-56 produced by Witco Corp., aliphatic-polycarbonate diols, such as UH-Carb300 from Ube Industries, polydimethylsiloxane diols, such as FM-4411 from Chisso Corp., polydimethylsiloxane diamines, such as FM-3311 or FM-3321 from Chisso Corp. or graft polyols, such as silicone graft polyols, like, FM-DA11 or FM-DA21 from Chisso Corp., and acrylic graft polyols, such as well as those disclosed in Lexmark Docket No. 2002-0785.00 U.S. Publication No. 2005/154174, entitled, "Graft Polymer Curatives and Polyurethanes Formed Therefrom," which is herein incorporated by reference. These curatives have a $M_n$ of at least about 800 and serve as chain extenders for the polyurethane elastomer which is formed by the polyurethane mixture.

In one particular embodiment, the first graft curative comprises FM-DA21 from Chisso Corp. and the second graft curative comprises polybutylacrylate graft diol. In one embodiment, at least two substantially immiscible graft curatives comprise at least about 14% by weight of the polyurethane elastomer.

In one embodiment, polydiene can be added to the polyurethane mixture in either diol or prepolymer form. In one embodiment, the polyurethane mixture includes polydiene diol or polydiene prepolymer, for example with toluene diisocyanate. In another specific embodiment of the invention, the polydiene diol comprises polybutadiene diol, which is a highly resistive material. The polybutadiene diol can provide the polyurethane elastomer from which a developer roll is comprised with a high resistive outer layer. In one particular embodiment, the polybutadiene diol can be Poly Bd® R-45HT, produced by Sartomer Co., which has a $M_n$ of about 2,800 and a microstructure of 20% cis-1,4-polybutadiene, 60% trans-1,4-polybutadiene and 20% 1,2-vinylpolybutadiene. In this embodiment, the polybutadiene diol serves as a chain extender for the urethane prepolymer.

In one embodiment, the polydiene can be blended with the urethane prepolymer in various proportions. For example, typical urethane prepolymer/polydiene blend ratios range from about 95/5 parts by weight to about 60/40 parts by weight.

In another exemplary embodiment, the polyurethane mixture can further comprise various additives to provide particular desirable properties to the resultant polyurethane elastomer. For example, additional curing additives can be used, such as tri-functional polyols. In one embodiment, the tri-functional polyol curative can be a tri-functional polyether triol, such as Simulsol TOIE® produced by SEPPIC. The tri-functional polyol curative can be used to cure the blend of urethane prepolymer with polydiene. For example, in one embodiment, the urethane prepolymer, such as the polycaprolactone type urethane prepolymer, can be cured by using a combination of a polybutadiene diol and a tri-functional polyol curative, such as Simulsol TOIE®.

In one embodiment, a conductive modifier can be added to the polyurethane mixture to reduce the resistivity of the polyurethane elastomer. In one particular embodiment, the conductive modifier comprises ferric chloride. Other conductive modifiers, such as ferrous chloride, calcium chloride and cobalt hexafluoroacetylacetonate are suitable alternatives to the ferric chloride. In a more specific embodiment, the conductive modifier can be added to the polyurethane mixture to reduce the blend bulk resistivity to less than about $1 \times 10^9$ ohm-cm. In order to achieve desirable resisitivity values for the polyurethane elastomer, typical concentrations of conductive modifier range from about 0.05 to about 0.50 parts by weight per hundred parts by weight polyurethane elastomer, more specifically about 0.150 to about 0.400 parts by weight per hundred parts by weight polyurethane elastomer.

In one embodiment, an antioxidant can be added to the polyurethane mixture, for example, to control the oxidative nature of the polyurethane elastomer. In one embodiment, the antioxidant comprises a substituted phenol, for example, 2,6-di-t-butyl-butyl-4-methyl-phenol (BHT), or other suitable substituted antioxidant material. Although to achieve desirable effects, typical amounts of antioxidant can vary, in one particular embodiment, about 3000 parts per million have been shown to be effective in controlling the oxidative aging of the polyurethane elastomer. One skilled in the art will appreciate that additional antioxidants are available and suitable for use herein.

Polyurethane can degrade when exposed to a high level of moisture such as 80% relative humidity for a prolonged period of time and high temperature can accelerate the degradation of polyurethane elastomers. Also, an acidic source, such as a conductive modifier like ferric chloride, will accelerate the degradation of the polyurethane elastomers. Degradation is defined as the loss in durometer hardness over time and is characterized herein as a loss in durometer hardness when exposed to a high temperature and high humidity environment such as 60° C. and 80% relative humidity for a specified period of time. Therefore, to offset such problematic conditions, the polyurethane mixture includes a hydrolytic stabilizer to maintain the polyurethane elastomer's physical and electrical properties over a long period of time and at various environmental conditions. The addition of a hydrolytic stabilizer acts to hydrolytically stabilize the inventive polyurethane elastomer, for whatever manner it may be used in, for example, on a developer roll used in an image forming device. In one particular embodiment, the hydrolytic stabilizer is triisopropanolamine (TIPA). In another embodiment, the amount of TIPA added to the polyurethane mixture is functionally low such that it does not effectively influence the electrical properties of the polyurethane elastomer. Other hydrolytic stabilizers are known in the art and are suitable for use herein, with the selection thereof being within the ability of one of ordinary skill in the art.

One embodiment of the present invention is directed to methods of manufacturing polyurethane elastomers curing a polyurethane mixture comprising urethane prepolymer and first and second graft curatives, each graft curative having a $M_n$ of at least about 800, wherein the first and second graft curatives are substantially immiscible with one another. In a more specific embodiment, the methods of manufacturing a polyurethane elastomer which exhibit a hardness of less than about 40 Shore A according to ASTM D2240-86 and a compression set of less than about 5% according to ASTM D395-89, method B at a temperature of about 70° C. for about 22 hours.

In one embodiment, the inventive rolls comprise a polyurethane elastomer formed from a urethane prepolymer and first and second graft curatives, each graft curative having a $M_n$ of at least about 800, wherein the first and second graft curatives are substantially immiscible with one another. As can be appreciated by one skilled in the art, the rolls can comprise any of the polyurethane elastomers previously described.

Typical rolls comprised of polyurethane elastomers exhibiting a hardness ranging from 40–60 Shore A use plasticizers, which may be detrimental to the toner and/or the photoconductor drum material in electrophotographic applications. Without the use of a plasticizer, high molecular weight polyols can be used to achieve this hardness range, however, this approach can lead to a substantial increase in compression set. In one embodiment, the inventive rolls comprised of the polyurethane elastomers as described above exhibit a hardness of less than about 40 Shore A, while maintaining a compression set of less than about 8%. In a particular embodiment, the roll comprised of the inventive polyurethane elastomer exhibits a hardness of less than about 38 Shore A and a compression set of less than about 5%, which achieves desirable properties such as uniform printing performance.

In one exemplary embodiment, the inventive methods of manufacturing rolls comprise casting a polyurethane mixture into a mold, wherein the polyurethane mixture comprises urethane prepolymer and first and second graft curatives, each graft curative having a $M_n$ of at least about 800, wherein the first and second graft curatives are substantially immiscible with one another; curing the polyurethane mixture to allow demolding of the roll; demolding the roll and, optionally, post-curing the demolded roll; grinding the roll to desired dimensions; and baking the roll under conditions sufficient to oxidize an outer layer of the roll. In a particular embodiment, the polyurethane mixture can be cast into a mold around a central, metal shaft.

In one exemplary embodiment, the polyurethane mixture is cured at a temperature from about 90° C. to about 120° C. using a combination of mold curing and post-curing for a total of about 12 hours to about 20 hours. In a more specific embodiment, the polyurethane mixture is cured at about 100° C. for a total of 16 hours. The polyurethane mixture can be subjected to a temperature sufficiently high for curing, but one that will not cause thermal degradation of the polyurethane.

In another exemplary embodiment, the cured roll is ground to desired dimensions. Then, the roll is baked under conditions sufficient to oxidize the outer layer of the roll. In another embodiment, by baking the ground roll in air at an elevated temperature from about 80° C. to about 140° C. for anywhere from about 6 hours to days, a resistive layer on the outer layer of the roll is produced. Baking the roll oxidizes the polybutadiene that was included in the polyurethane mixture. Polybutadiene diol or polybutadiene prepolymer is highly unsaturated such that it is very susceptible to oxidation. The presence of a conductive modifier, for example, ferric chloride, catalyzes this oxidation. The thickness and electrical resistivity of the outer layer can be controlled by varying the concentration of ferric chloride, polybutadiene diol or prepolymer, the baking temperature, the level of oxygen, and baking time.

The resisitivity level of the outer layer of the rolls can be measured using the following exemplary embodiment. A conductive media such as conductive carbon paint or tape is applied in about an 8-mm strip down the roll. A circuit is made by making electrical contact with the conductive carbon tape and the roll shaft. The direct current resistivity of the roll at about 100 volts, the time constant, and the alternating current resistivity of the roll at 1 kHz are measured. The time constant is measured by applying a 100 volt bias to the roll, removing the voltage, then measuring the time for the voltage on the roll to decay to about 1/e (or about 37%) of its original value. This time constant is related to the resistivity and thickness of the outer layer of the roll. The roll can be modeled as two parallel RC circuits in series. One RC circuit represents the core and the second represents the resistive surface layer. In one embodiment, the following model was applied in calculating the time constant.

$$\tau = R*C = \rho_c * K_c * \epsilon_o$$

$$\rho_c = \tau/(K_c * \epsilon_o)$$

$$Tc = 10{,}000\ (R*A/\rho_c)$$

$$\rho_b = R_b * (A/T)$$

where,

τ=time constant (sec)

$\rho_c$=resistivity of resistive outer layer (ohm-cm)

C=capacitance (farad)

$K_c$=dielectric constant of material $E_o$=permittivity of free space=$8.85 \times 10^{-12}$ C$^2$/N m$^2$=$8.85 \times 10^{-14}$ F/cm Tc=thickness of resistive outer layer (μm)

R=roll DC resistance (ohm)

A=surface area of the electrical measurement of the roll (cm$^2$)

T=thickness of bulk rubber layer (cm)

$R_b$=roll AC resistance (ohm) @ 1 kHz $\rho_b$=bulk resistivity (ohm-cm)

The resistivity and thickness of the outer layer of the roll can be calculated from the time constant and DC resistance measurements. The dielectric constant of the coating is assumed to be 10, a typical value for a polyurethane elastomer. In one embodiment, the desired electrical properties of the roll include a bulk resistivity less than about $1.0 \times 10^9$ ohm-cm, outer layer resistivity from about $5.0 \times 10^9$ ohm-cm to about $2.0 \times 10^{12}$ ohm-cm, outer layer thickness from about 30 μm to about 200 μm, and the time constant from about 5 to about 2000 milliseconds (ms), all measured at 22° C. and 50% relative humidity. In another embodiment, the bulk resistivity is less than about $3.0 \times 10^8$ ohm-cm, the outer layer resistivity is about $1.0 \times 10^{11}$ ohm-cm, the outer layer thickness is about 100 μm, and the time constant is about 100 ms.

EXAMPLES 1–5

The following examples are intended to demonstrate improvements of the inventive polyurethane elastomers and rolls comprised of such polyurethane elastomers. Examples 1–4 are comparative in nature, while Example 5 is illustrative of the invention. These examples should not be construed to limit the scope of the inventive polyurethane elastomers, associated methods of manufacture or the rolls. These sample formulations are summarized below, including oxidative treatment for forming a resistive outer layer. Characteristics of the rolls produced from the sample formulations, such as compression set, hardness, resistivity, and amount of extractables are illustrated in Table 1.

Formulations:

EXAMPLE 1

| Ingredient | Percent by Weight of PU mixture |
|---|---|
| Polycaprolactone urethane prepolymer | 67.61 |
| Polybutadiene diol | 12.00 |
| Polyether triol | 2.98 |
| Polydimethylsiloxane diol | 16.84 |
| Conductive modifier | 0.14 |
| Antioxidant | 0.33 |
| Hydrolytic stabilizer | 0.11 |
| Total | 100.00 |

Oxidative bake process: 12 hours at 100° C.

EXAMPLE 2

| Ingredient | Percent by Weight of PU mixture |
|---|---|
| Polycaprolactone urethane prepolymer | 64.65 |
| Polybutadiene diol (w/antioxidant) | 12.47 |
| Polyether triol | 2.64 |
| Polydimethylsiloxane diol | 19.99 |
| Conductive modifier | 0.149 |
| Hydrolytic stabilizer | 0.11 |
| Total | 100.00 |

Oxidative bake process: 12 hours at 100° C.

EXAMPLE 3

| Ingredient | Percent by Weight of PU mixture |
|---|---|
| Polycaprolactone urethane prepolymer | 70.07 |
| Polybutadiene diol (w/antioxidant) | 12.33 |
| Polyether triol | 2.72 |
| Polyacrylate graft diol | 14.63 |
| Conductive modifier | 0.15 |
| Hydrolytic stabilizer | 0.10 |
| Total | 100.00 |

Oxidative bake process: 10 hours at 120° C.

EXAMPLE 4

| Ingredient | Percent by Weight of PU mixture |
|---|---|
| Polycaprolactone urethane prepolymer | 65.43 |
| Polybutadiene diol (w/antioxidant) | 12.33 |
| Polyether triol | 2.00 |
| Polyacrylate graft diol | 20.00 |
| Conductive modifier | 0.14 |
| Hydrolytic stabilizer | 0.10 |
| Total | 100.00 |

Oxidative bake process: 10 hours at 120° C.

EXAMPLE 5

| Ingredient | Percent by Weight of PU mixture |
|---|---|
| Polycaprolactone urethane prepolymer | 59.59 |
| Polybutadiene diol (w/antioxidant) | 12.41 |
| Polyether triol | 1.74 |
| Polydimethylsiloxane diol | 12.00 |
| Polyacrylate graft diol | 14.05 |
| Conductive modifier | 0.128 |
| Hydrolytic stabilizer | 0.10 |
| Total | 100.00 |

Oxidative bake process: 12 hours at 100° C.

TABLE 1

Physical Properties of Example Formulations

| Example | Hardness[1] | Compression Set[2] | $\rho_c$ (ohm-cm) | Tc (μm) | $\rho_b$[3] (ohm-cm) | Extractable $(CHCl_3)$[4] |
|---|---|---|---|---|---|---|
| 1 | 47 | 4% | $1.2 \times 10^{11}$ | 144 | $1.3 \times 10^8$ | <3% |
| 2 | 44 | 4% | $1.4 \times 10^{11}$ | 153 | $1.5 \times 10^8$ | <5% |
| 3 | 42 | 3% | $2.0 \times 10^{11}$ | 95 | $9.6 \times 10^7$ | <4% |
| 4 | 41 | 6% | $4.7 \times 10^{10}$ | 107 | $9.8 \times 10^7$ | — |
| 5 | 37 | 2% | $5.7 \times 10^{11}$ | 127 | $2.3 \times 10^8$ | <4% |

[1]Hardness measured according to ASTM D2240-86
[2]Compression set measured according to ASTM D395-89; method B; exposed for about 22 hours at about 70° C.
[3]Bulk resistivity measured at 1 kHz
[4]Soxhlet extraction previously described As shown in Table 1, increasing the amount of curatives in the polyurethane elastomer example formulations 1 to 2 and formulations 3 to 4 results in a softer polyurethane elastomer material. However, an increase in compression set is also observed in these comparative examples. By combining graft curatives that are substantially immiscibile, as illustrated in example formulation 5, it is possible to prepare a polyurethane elastomer with a lower hardness and a significantly reduced compression set, thus illustrating the improved effect that the two immiscible graft curatives have on the resultant polyurethane elastomer.

While the invention has been described in detail with reference to specific embodiments thereof, it would be apparent to those skilled in the art that various changes and modifications may be made therein without departing from the spirit of the invention, the scope of which is defined by the following claims.

We claim:

1. A polyurethane elastomer formed from first and second graft curatives, each graft curative having a molecular weight of at least about 800 and a main chain having a molecular weight of less than about 200, wherein the first and second graft curatives are substantially immiscible with one another, and wherein the polyurethane elastomer exhibits a hardness of less than about 40 Shore A according to ASTM D2240-86 and a compression set of less than about 8% according to ASTM D395-89, method B, at a temperature of about 70° C. for about 22 hours.

2. The polyurethane elastomer according to claim 1, wherein the polyurethane elastomer is formed from a urethane prepolymer.

3. The polyurethane elastomer according to claim 1, wherein the first and second graft curatives individually comprise diol, polyol, diamine, or polyamine.

4. The polyurethane elastomer according to claim 3, wherein the first graft curative comprises a diol having an acrylate side chain and the second graft curative comprises a diol having a silicone side chain.

5. The polyurethane elastomer according to claim 4, wherein the respective acrylate and silicone side chains have a molecular weight of at least about 600.

6. The polyurethane elastomer according to claim 4 wherein the acrylate side chain is formed from n-butylacrylate.

7. The polyurethane elastomer according to claim 1, wherein the first and second graft curatives comprise at least about 14% by weight of the polyurethane mixture.

8. The polyurethane elastomer according to claim 2, wherein the urethane prepolymer comprises polyether prepolymer, polyester prepolymer, polycaprolactone prepolymer or combinations thereof.

9. The polyurethane elastomer according to claim 1, wherein the polyurethane mixture further comprises a polydiene, wherein the polydiene is polydiene diol or polydiene prepolymer.

10. The polyurethane elastomer according to claim 9, wherein the polydiene diol is polybutadiene diol.

11. The polyurethane elastomer according to claim 10, wherein the polyurethane mixture further comprises tri-functional polyol curative, conductive modifier, antioxidant, hydrolytic stabilizer or combinations thereof.

12. The polyurethane elastomer according to claim 11, wherein the conductive modifier is selected from the group consisting of ferric chloride, ferrous chloride, calcium chloride, cobalt hexafluoroacetylacetate and combinations thereof.

13. The polyurethane elastomer according to claim 12, wherein the conductive modifier comprises ferric chloride.

14. The polyurethane elastomer according to claim 13, wherein the compression set is less than about 6%.

15. The polyurethane elastomer according to claim 14, wherein the compression set is less than about 4%.

16. A roll formed from a polyurethane elastomer as recited in claim 1.

17. An image forming device having a roll as recited in claim 16.

18. The image forming device according to claim 17, wherein the image forming device comprises an electrophotographic printer.

19. A polyurethane elastomer formed from a urethane prepolymer, first and second graft curatives, each graft curative having a molecular weight of at least about 800, wherein the first and second graft curatives are substantially immiscible with one another and the first graft curative comprises a diol having an acrylate side chain and the second graft curative comprises a diol having a silicone side chain, polybutadiene diol, tri-functional polyol curative comprising polyether triol, conductive modifier comprising ferric chloride, hydrolytic stabilizer, and antioxidant, wherein the polyurethane elastomer exhibits a hardness of less than about 40 Shore A according to ASTM D2240-86 and a compression set of less than about 4% according to ASTM D395-89, method B, at a temperature of about 70° C. for about 22 hours.

20. A method of manufacturing a polyurethane elastomer, comprising curing a polyurethane mixture comprising first and second graft curatives, each graft curative having a molecular weight of at least about 800 and a main chain having a molecular weight of less than about 200, wherein the first and second graft curatives are substantially immiscible with one another, and wherein the polyurethane elastomer comprises a hardness of less than about 40 Shore A according to ASTM D2240-86 and a compression set of less than about 8% according to ASTM D395-89, method B, at a temperature of about 70° C. for about 22 hours.

21. The method according to claim 20, wherein the polyurethane mixture further comprises a urethane prepolymer.

22. The method according to claim 20, wherein the first and second graft curatives individually comprise diol, polyol, diamine, or polyamine.

23. The method according to claim 22, wherein the first graft curative comprises a diol having an acrylate side chain and the second graft curative comprises a diol having a silicone side chain.

24. The method according to claim 23, wherein the acrylate side chain is formed from n-butylacrylate.

25. The method according to claim 21, wherein the urethane prepolymer comprises polyether prepolymer, polyester prepolymer, polycaprolactone prepolymer or combinations thereof.

26. The polyurethane elastomer according to claim 20, wherein the polyurethane mixture further comprises a polydiene, wherein the polydiene is polydiene diol or polydiene prepolymer.

27. The polyurethane elastomer according to claim 26, wherein the polydiene diol is polybutadiene diol.

28. The method according to claim 20, wherein the polyurethane mixture further comprises tri-functional polyol curative, conductive modifier, antioxidant, hydrolytic stabilizer or combinations thereof.

29. The method according to claim 28, wherein the compression set is less than about 6%.

30. The method according to claim 29, wherein the compression set is less than about 4%.

31. A method of manufacturing a polyurethane elastomer, comprising curing a polyurethane mixture comprising urethane prepolymer, first and second graft curatives, each graft curative having a molecular weight of at least about 800, wherein the first and second graft curatives are substantially immiscible with one another and the first graft curative comprises a diol having an acrylate side chain and the second graft curative comprises a diol having a silicone side chain, polybutadiene diol, tri-functional polyol curative comprising polyether triol, conductive modifier comprising ferric chloride, hydrolytic stabilizer, and antioxidant, wherein the polyurethane elastomer exhibits a hardness of less than about 40 Shore A according to ASTM D2240-86 and a compression set of less than about 4% according to ASTM D395-89, method B, at a temperature of about 70° C. for about 22 hours.

32. A roll comprising a polyurethane elastomer formed from a urethane prepolymer, first and second graft curatives, each graft curative having a molecular weight of at least about 800, wherein the first and second graft curatives are substantially immiscible with one another, polydiene diol or prepolymer, tri-functional polyol curative, conductive modifier, hydrolytic stabilizer, and, optionally, antioxidant.

33. A method of manufacturing a roll, comprising:
 a) casting a polyurethane mixture into a mold, wherein the polyurethane mixture comprises a urethane prepolymer, first and second graft curatives, each graft curative having a molecular weight of at least about 800, wherein the first and second graft curatives are substantially immiscible with one another, polydiene diol or prepolymer, tri-functional polyol curative, conductive modifier, hydrolytic stabilizer, and, optionally, antioxidant;
 b) curing the polyurethane mixture to allow demolding of the roll;
 c) demolding the roll and, optionally, post-curing the demolded roll;
 d) grinding the roll to desired dimensions; and
 e) baking the roll under conditions sufficient to oxidize an outer layer of the roll.

* * * * *